Nov. 25, 1958

I. IMAZIMI ET AL 2,861,703

AGRICULTURAL VEHICLE

Filed May 22, 1956

INVENTOR.
ISAO IMAZIMI
STANLEY E. POTTER
BY MICHAEL T. WARNER

BY

ATTORNEY

INVENTOR.
ISAO IMAZIMI
STANLEY E. POTTER
MICHAEL T. WARNER
BY
ATTORNEY

United States Patent Office 2,861,703
Patented Nov. 25, 1958

2,861,703
AGRICULTURAL VEHICLE

Isao Imazimi, Stanley E. Potter, and Michael T. Warner, San Diego County, Calif.; said Imazimi and said Warner assignors to said Potter Application May 22, 1956, Serial No. 586,576

5 Claims. (Cl. 214—83.1)

Our invention relates to agricultural machinery and has more particular reference to a conveyance for transporting agricultural workers in a prone position for gathering agricultural produce from low growing plants such as cucumbers, melons and the like.

In the growing of cucumbers for pickling, it is necessary to pick the young fruit prior to maturity at frequent intervals in order to obtain the best fruit for pickling purposes. The agricultural industry has experienced considerable difficulty in obtaining satisfactory labor because of the stooping position in which the laborer must work. Not only is it difficult to obtain such stoop labor, but the process of picking is extremely slow resulting in unduly high labor costs.

It is one of the objects of our invention to provide a carrier which will support and transport a plurality of agricultural workers through a field and in a prone position spaced from the ground for convenient working.

It is a further object of our invention to provide an agricultural vehicle for transporting workers through a field and having means included therein for transporting the produce gathered by the individual workers to a separate and convenient packing area.

Quite frequently the field in which the agricultural produce is grown contains uneven surfaces such as small hills or rises in the ground. It is also an object of our invention to provide such agricultural vehicle having platforms extending laterally therefrom which may be raised or lowered to position the workers with respect to such uneven contours.

It is also among the objects of our invention to provide a self propelled agricultural carrier for carrying workmen in a prone position above the growing plants thereby eliminating trampling of the vines.

Yet another object of our invention is to provide an agricultural vehicle that greatly increases the efficiency of agricultural workers in harvesting low growing crops.

We have found that with the use of one of our carriers, it is possible to harvest up to 274 pounds of pickling cucumbers per hour. Without the use of the machine the picking rate was from 80 to 100 pounds per hour.

The use of the carrier also eliminated trampling of the vines and resulted in cleaner picking and fewer culls. Another advantage in the use of our invention lies in the fact that its speed of movement over the ground can be changed to correspond to a light or heavy pick. This is not possible with ordinary stoop labor.

Also, since the excessive fatigue of stooping is eliminated, workers perform a better job of picking and work at an increased rate, thereby reducing the labor cost.

Other and further objects and advantages will become apparent from the drawings and the specifications descriptive thereof.

Figure 1:
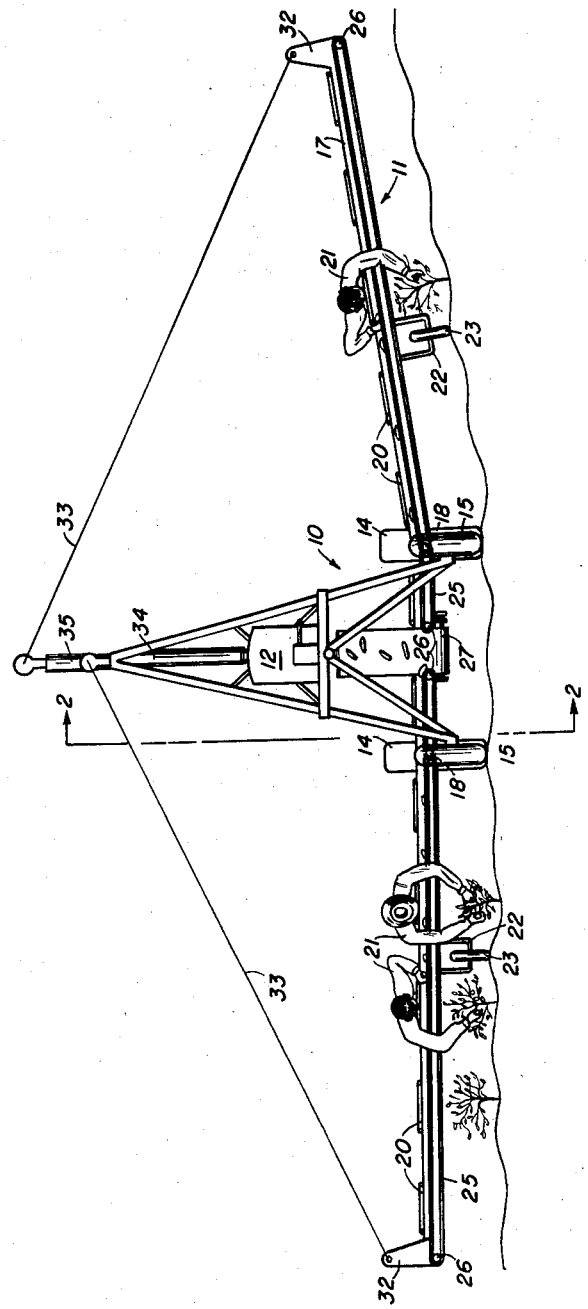
Fig. 1 is a front elevation of an agricultural vehicle embodying the principles of our invention.
Figure 2:
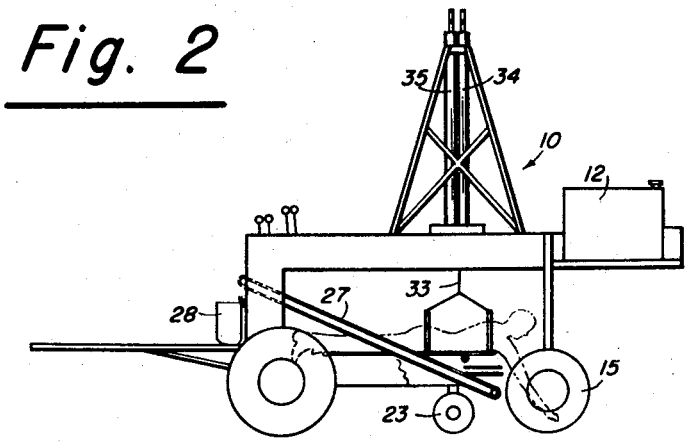
Fig. 2 is a sectional side elevation taken on line 2—2 of Fig. 1.
Figure 3:
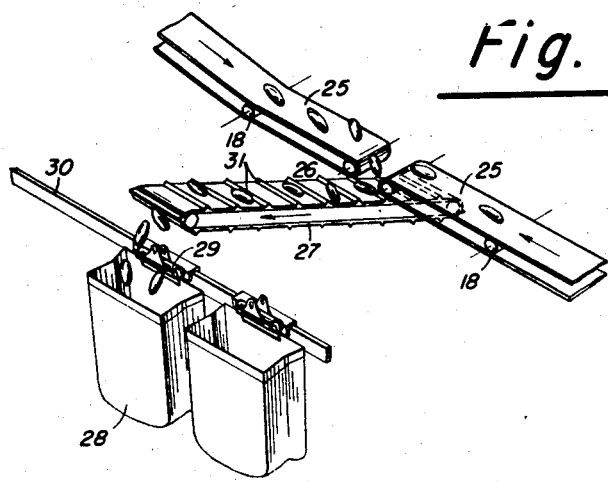
Fig. 3 is a fragmentary perspective view of produce conveying means used in one form of our invention.

Referring more specifically to Figs. 1 and 2 it will be seen we have provided a main frame designated generally by the numeral 10 having lateral arms designated generally 11 supported thereby and a source of power 12 operatively coupled to ground engaging wheels such as 14 and 15. The coupling means is not shown since it is felt that this particular feature is standard equipment and is well known to those skilled in the art.

The lateral arms 11 comprise a platform 17 pivotally connected to a frame 10 at pivot point 18. Each of the platforms 17 supports a plurality of beds 20 adapted to receive a worker such as 21, in prone position with his arms extending over the leading edge of the platform 17. Each lateral arm 11 is supported by means of a frame 22 having a ground engaging wheel 23 rotatably disposed thereon.

A conveyor belt such as 25 is disposed subadjacent the leading edge of each platform 17 in position so the worker 21 can quickly and conveniently dispose produce on said belt and supported by rollers 26 mounted under each platform 17. The upper surface of each belt moves inwardly towards the center of frame 10.

A transfer belt 27 is positioned below the drop-off point of each of the belts 25 to accept the produce therefrom and transport it upwardly where it falls off said transfer belt into a packing bag such as 28. The packing bags 28 are retained in position by means of a clip 29 slideably mounted on a transverse rod or rail 30. If desired the belt 27 may be formed with transverse ribs 31 to prevent the fruit from sliding or rolling downhill.

It will be understood that any suitable power take-off means can be used for transferring power from the source of power 12 to the conveyor belts. These are not shown because they are well known to those skilled in the art.

Each of the arms 11 is provided with a bracket 32 at the outer end thereof to which is attached one end of a lifting cable 33. The other end of the cable 33 is secured to power means for raising said cable such as herein illustrated as hydraulic cylinders 34 and 35. It is apparent that other means may be employed for raising the outer ends of the arms 11 such as a screw jack or a drum and pulley arrangement. It is also apparent that one cylinder may be substituted in place of two. We prefer two cylinders so that the lateral arms 11 can be selectively raised.

It will become readily apparent that workers lying in a prone position on the beds 30 would be far less subject to fatigue in gathering low growing agricultural harvests and can very easily and readily gather the fruit and deposit them on the conveyor belt 25 where it will be transported inwardly and transferred to the belt 26 for transportation to the packing containers 27.

Upon reaching the end of each row the workers dismount and the arms are raised so that the ground engaging wheels 23 are free of the ground to thereby permit turning of the equipment without damage to the plants.

It is also apparent that either arm may be raised independently of the other either by the selective extension of the hydraulic cylinders 34 or 35 or due to the uneven contour of the ground raising upwardly against the wheels 23. The length of the frame 22 and the size of the wheel 23 determine at all times the position of the worker with respect to the ground substantially independently of the contour of such ground.

Whereas we have described and illustrated our invention in a substantially schematic manner leaving out a great many of the details of construction, these details are such that anyone skilled in the art can readily supply them. It is also apparent that a great many modifications may be incorporated in such a device within the scope

We claim:

1. An agricultural vehicle comprising: a frame supported by ground engaging wheels; a laterally extending arm pivotally secured to each side of said frame for upward or downward pivotal movement; power means to selectively raise or lower each said arm; a plurality of beds carried by each arm for supporting a worker in a prone position; power driven conveyor means associated with each arm to receive produce harvested by said prone worker for transporting said produce to a packing area, and adapted to be operative in any of its selective upward or downward positions.

2. An agricultural vehicle comprising: a frame supported by ground engaging wheels; a laterally extending arm pivotally secured to each side of said frame for upward or downward pivotal movement; power means to raise or lower said arms; a plurality of beds carried by each arm for supporting a worker in a prone position; power driven conveyor means disposed adjacent the leading edge of each arm to receive produce harvested by said prone workers and adapted to be operative in any of its selective upward or downward positions; and transfer conveyor means disposed adjacent the inner end of each said first conveyor for transporting said produce to a packing area.

3. An agricultural vehicle comprising: a frame supported by ground engaging wheels; a source of power for driving said wheels; a laterally extending arm pivotally secured to each side of said frame for upward or downward pivotal movement; ground engaging wheels carried by and supporting said arms; power means to selectively raise or lower each said arm; a plurality of beds carried by each arm for supporting a worker in a prone position; power driven conveyor means disposed adjacent the leading edge of each arm to receive produce harvested by said prone workers adapted to be operative in any of its selective upward or downward positions; and second conveyor means disposed adjacent the inner end of each said first conveyor for transporting said produce to a packing area.

4. In combination with an agricultural vehicle having a frame, ground engaging wheels and a source of power; a platform extending laterally from each side of said frame and having an inner end pivotally secured thereto for vertical positioning thereof; ground engaging wheels secured to the underside of each said platform to accommodate said platform to uneven ground contours; means carried on the upper side of each platform for supporting a worker in prone position and in spaced relation above the ground; power driven conveyor means carried by each said arm for transporting farm produce inwardly to said frame and operative in any of its selective upward or downward positions; second conveyor means adjacent the inner ends of said first mentioned conveyor means for accepting said produce and transporting it to a packing area; and means operable by said source of power for selectively raising each said platform, and including flexible support means to thereby permit raising the outer end of each platform independent of said source of power.

5. An agricultural vehicle comprising a frame; a source of power supported by said frame; ground engaging wheels supporting said frame and driven by said source of power; a laterally arm pivotally secured to each side of said frame; means for selectively raising or lowering said arms; a ground engaging wheel secured to the under surface of each said arm adapted to support said arm in spaced relation to said ground and to cause raising and lowering of said arm in response to uneven contours therein; an endless belt conveyer supported subadjacent the leading edge of each said arm and operated by said source of power in any selective position of said arm; a packing platform carried by said frame having means for supporting packing containers; and transfer conveyer means disposed between the inner ends of each of said first mentioned conveyers adapted to receive produce from said first mentioned conveyers and transport said produce into said packing containers.

References Cited in the file of this patent

UNITED STATES PATENTS

| | | |
|---|---|---|
| 1,504,846 | Tarkington | Aug. 12, 1924 |
| 2,267,234 | Garber | Dec. 23, 1941 |
| 2,321,387 | Jackson | June 8, 1943 |
| 2,378,847 | Harris | June 19, 1945 |
| 2,590,965 | Huston | Apr. 1, 1952 |
| 2,782,943 | Jones et al. | Feb. 26, 1957 |